Jan. 8, 1963  A. B. BASSOFF  3,072,116
METHOD FOR TRIMMING A GEAR HONING TOOL
Filed June 15, 1960  2 Sheets-Sheet 1
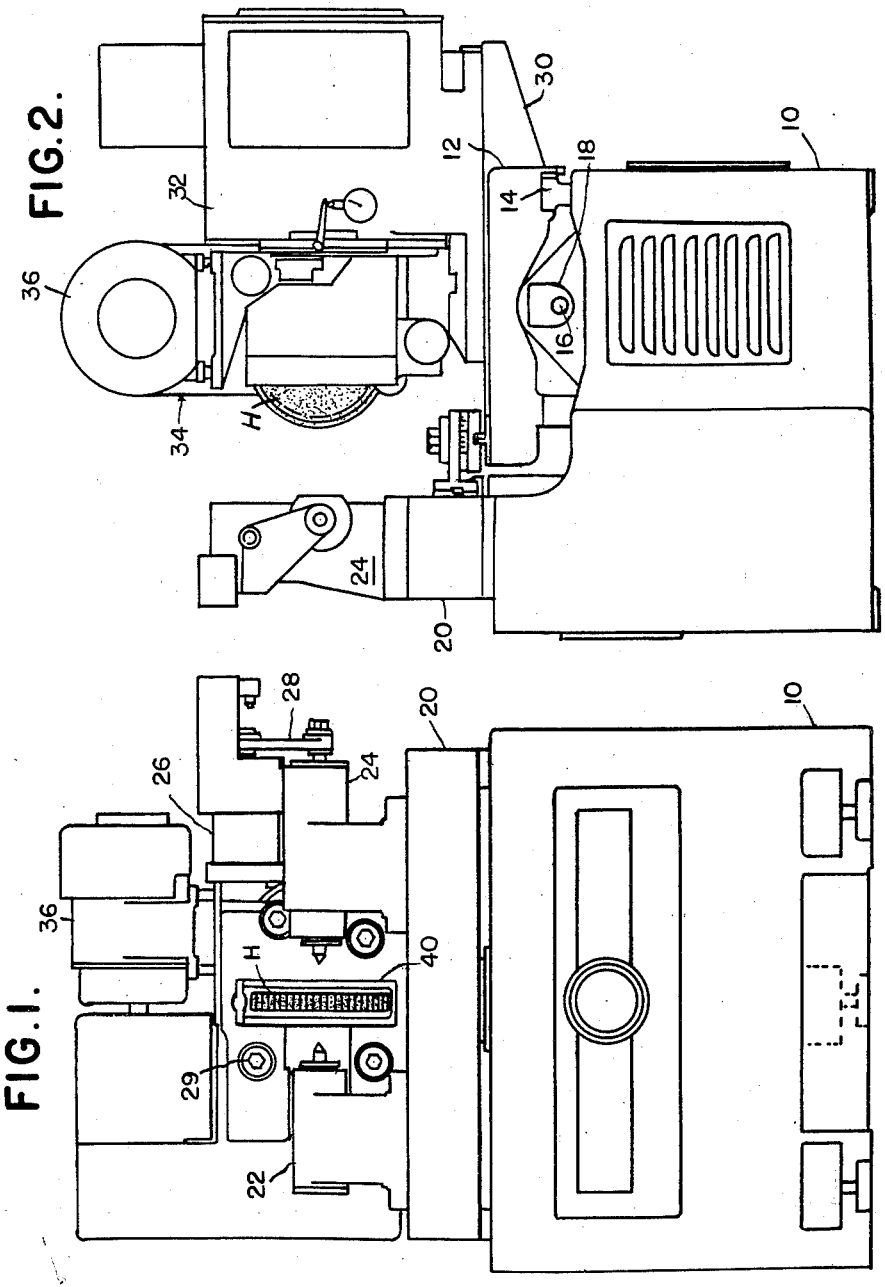
INVENTOR.
ARTHUR B. BASSOFF
ATTORNEYS Jan. 8, 1963   A. B. BASSOFF   3,072,116
METHOD FOR TRIMMING A GEAR HONING TOOL
Filed June 15, 1960   2 Sheets-Sheet 2
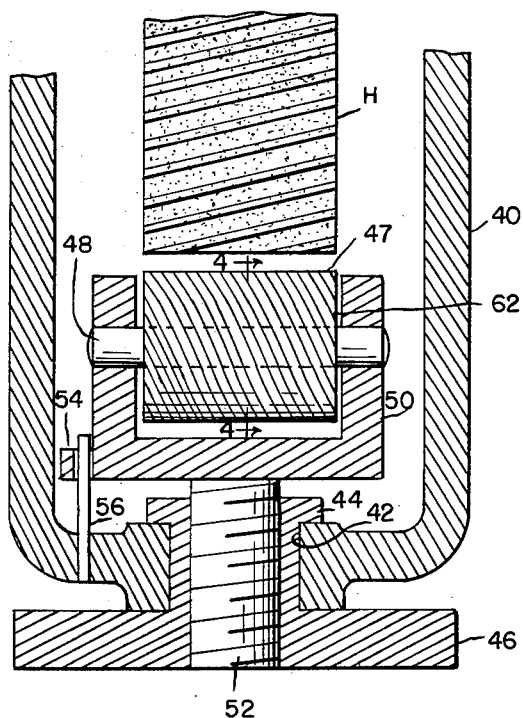
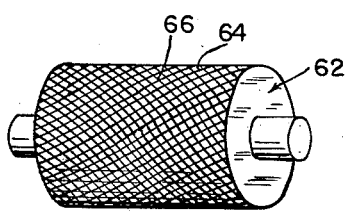
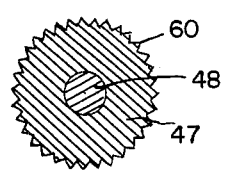
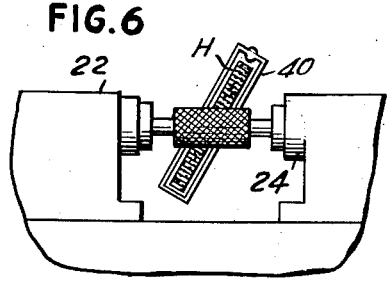
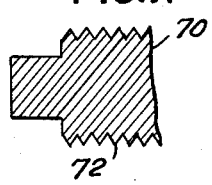
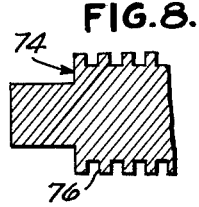
INVENTOR.
ARTHUR B. BASSOFF
BY
ATTORNEYS

United States Patent Office 3,072,116
Patented Jan. 8, 1963

3,072,116
METHOD FOR TRIMMING A GEAR HONING TOOL
Arthur B. Bassoff, Detroit, Mich., assignor to National Broach & Machine Company, Detroit, Mich., a corporation of Michigan
Filed June 15, 1960, Ser. No. 36,335
8 Claims. (Cl. 125—11)

The present invention relates to a method for trimming a gear honing tool.

The gear honing tool which requires trimming in accordance with the present invention, is a tool in the form of a gear adapted to mesh with a gear to be honed. Honing tools are used primarily for the purpose of finishing by a honing action, the working surfaces of the teeth of a work gear after it has been hardened. The honing tool is characterized by having at least its toothed portion formed of a resin compound having abrasive particles embedded therein. The resin compound is quite hard but slightly yieldable and highly resilient so that if an abrasive particle is overstressed the supporting resin will yield slightly to avoid tearing the particle out of the resin matrix. After the stress has been relieved the resilience of the resin compound restores the abrasive compound to its initial position.

While honing tools of this type are capable of finishing many thousands of work gears, nevertheless there is a continuous wear or breakdown of the material of the hone so that the teeth of the hone become narrower and the teeth of the work gears enter into tight mesh with the teeth of the hone at reduced center distances. At intervals during the useful life of a honing tool, it is often desirable to remove material from the crests of the teeth, or in other words, to reduce its outside diameter.

It is an object of the present invention to provide a method for removing material from the outside diameter or crests of the teeth of a gear honing tool.

It is a further object of the present invention to provide a method for removing material from the crests of the teeth or the periphery of the hone, comprising the step of rolling a trimming tool having a trimming surface at its periphery in pressure contact with the periphery of the honing tool with the axes of the tools crossed in space.

It is another object of the present invention to provide a method as described in the previous paragraph comprising the steps of driving either the honing tool or the trimming tool directly and driving the other tool solely through its pressure contact with the directly driven tool.

It is a further object of the present invention to provide a method as described in the preceding paragraphs comprising in addition, the steps of effecting a relative traverse between the honing tool and trimming tool in a direction which occupies a plane parallel to the axes of both of said tools.

It is a further object of the present invention to provide a method as described in any of the preceding three paragraphs, which comprises in addition, the step of effecting a relative feed between the honing tool and the trimming tool to control the depth of removal of material from the crests of the teeth of the hone.

Other objects and features of the invention will become apparent as the description proceeds, especially when taken in conjunction with the accompanying drawings, illustrating preferred embodiments of the invention, wherein:

FIGURE 1 is a front elevation of a gear honing machine to which the present invention is applied.

FIGURE 2 is a side elevation of the machine shown in FIGURE 1.

FIGURE 3 is an enlarged fragmentary sectional view through the hone trimming mechanism.

FIGURE 4 is a sectional view of the hone taken on the line 4—4, FIGURE 3.

FIGURE 5 is a perspective view of a hone having somewhat different surface treatment.

FIGURE 6 is a fragmentary front elevation of the machine illustrated in FIGURE 1 showing the honing tool in inclined position relative to the trimming tool.

FIGURES 7 and 8 are fragmentary elevational views of modified forms of trimming tools.

Referring first to FIGURES 1 and 2, the gear honing machine comprises a base 10 provided with a slide 12 mounted on rails 14 and adapted to be traversed rectilinearly along such ways by traverse mechanism including a feed screw 16 and associated feed nut 18 indicated diagrammatically in FIGURE 2. Mounted on the base 10 is a work support platform 20 having a tail stock 22 thereon and a power headstock 24 associated therewith. The power headstock includes an air cylinder 26 connected by a suitable yoke 28 to the center of the headstock 24 so that the center may be advanced or retracted relative to the center of the tail stock to engage or release a work gear.

In the machine the work supporting centers in the head and tail stocks are provided on free running spindles and direct rotation is imparted to a gear finishing hone H. In addition, the necessary relative adjustment between a work gear carried between the head and tail stocks and the hone H to provide for a desired crossed axes relationship, is provided specifically by mounting the tool for angular adjustment. Specifically, the tool support structure, later to be described, may be mounted in arcuate T-slots by suitable means including bolts 29. Also, means are provided for effecting relative radial approach and separation between the gear and hone, this means comprising a cross slide 30.

Carried by and movable with the cross slide 30 is a tool support column 32. Connected to the tool support column is a tool supporting and driving assembly indicated generally at 34. The assembly includes the motor 36 and a transmission (not shown) connecting the motor to the honing tool H. The honing tool however, is mounted in a separately movable tool head or housing 40. The tool head 40 is relatively movable toward and away from the axis of a work gear supported between the centers of the head and tail stocks 22, 24 so that the hone may be biased into engagement with a work gear under a controlled pressure. The movable tool head 40 may however be rigidly connected to the cross slide 30 when desired.

In operation, a work gear is supported between the centers of the head and tail stock in mesh with the honing tool. In FIGURES 1 and 2 the honing tool H is shown with its axis horizontal for convenience, but in practice it will be inclined so that its axis is in crossing relation to the axis of the work gear, as for example at an angle between three and thirty degrees. In the honing operation the honing tool is urged against the work gear with a predetermined pressure, after which it may if desired be locked against movement toward or away from the work gear. The honing tool is then driven in rotation and performs a honing operation on the teeth of the work gear. During the meshed rotation of the hone and work gear relative traverse between the honing tool and work gear is provided by traversing the slide 12 on the rails 14, which as will be obvious, is in a direction parallel to the axis of the work gear.

As previously stated, a single hone is adapted to finish in some cases many thousands of work gears, so that the hone becomes worn during its usage and it becomes desirable to remove material from the crests of its teeth. For this purpose the hone trimmer best illustrated in FIGURE 3 is provided. The hone trimmer is mounted in a portion of the housing 40. For this purpose there is provided in a portion of the housing 40 spaced from the edge or periphery of the honing tool H, an opening 42 which receives a nut 44 provided with a knurled head or handle 46. A rotatable trimming tool 47 is mounted for free rotation on a threaded shaft 48 carried by a yoke 50 fixedly connected to a threaded shaft 52 which is threadedly connected to nut 44. The yoke 50 is prevented from rotation by suitable means such for example as an apertured lug 54 receiving a pin 56 carried by the housing 40. As suggested in this figure the honing tool 47 is positioned with its axis crossed with respect to the axis of the hone. The crossing angle may be relatively small or it may be substantial, as for example as much as 45 degrees.

With the foregoing construction it will be observed that rotation of the nut 44 by the handle 46 will cause the trimming tool 47 to move toward and away from the periphery of the hone H.

Referring now to FIGURES 3 and 4 the trimming tool 47 is seen to have a trimming surface at its periphery including a multiplicity of knife edges 60 formed by the intersection of opposite sides of a series of helical teeth. As best seen in FIGURE 3, the teeth are illustrated to extend at an angle of approximately 45 degrees, but this angle is not particularly critical.

As an alternative, and as illustrated in FIGURE 5, the trimming tool 62 may be provided with two sets of helical teeth 64 and 66 extending at opposite ends, at least one set of the helical teeth being shaped to terminate in knife edges, the teeth of opposite hand serving to interrupt the knife edge of a single tooth. In some cases the second set of helical teeth may also be shaped so that the opposite sides thereof would intersect to provide a knife edge, in which case the intersection of the two sets of helical teeth produce in effect a knurled surface comprising a multiplicity of generally pyramidal sharp pointed projections.

Other surface treatments of the trimming tool may be provided, such for example as the tool 70 of FIGURE 7 having a continuous thread-like structure 72 terminating in a knife edge, or the tool 74 of FIGURE 8 having a continuous helical groove 76 having parallel sides defining generally 90-degrees cutting edges in the surface of the trimming tool.

In trimming material from the outside diameter of the honing tool H, or in other words to remove material from the crests of the teeth of the honing tool, the honing tool may be driven in rotation by the motor 36 and the trimming tool 47 fed into pressure engagement with its periphery. Rotation will be imparted to the trimming tool by its pressure engagement with the hone and due to the crossed axes relaationship, there will be a sliding action which causes the trimming edges of the trimming tool to remove material from the hone. The handle 46 may be rotated to provide the required radial feed to remove as much material as desired from the hone.

As an alternative, a trimming tool such as shown in detail in FIGURES 4 or 5 may be mounted between the centers of the head and tail stocks 22, 24. With this arrangement and with the honing tool H inclined as previously described, and as illustrated in FIGURE 6, the machine may be operated in the same manner as for honing a gear. That is, traverse of the slide 12 along the ways 14 may be provided which causes a relative movement between the honing tool H and the trimming tool in a direction occupying a plane parallel to the axes of both tools. This has the effect of producing a more uniform and smooth surface finish on the crests of the teeth of the hone if desired.

An important feaature of the present invention resides in the fact that it completely avoids impacts between the trimming tool and the teeth of the hone. It will be appreciated that if ordinary diamond trimming were employed, using a trimming tool operating substantially as a single point tool, there would be a multiplicity of impacts between the trimming tool and each tooth of the hone. With the present invention the generally cylindrical trimming tool is positioned with its axis crossed with respect to the axis of the hone. The direction of inclination of the axis of the trimming tool with respect to the axis of the hone is chosen so that the peripheral surface of the trimming tool, which is provided with the cutting elements in the form of cutting points or edges, is in contact with a plurality of teeth.

Moreover, due to the crossed axes relationship there is a component of relative motion between the trimming tool and the honing tool which extends axially of the honing tool. Thus, while only one of the rotary supports is directly driven and the other rotary support is mounted for free rotation, the relative rotation between the honing tool and the trimming tool results in a component of motion axially of the gear hone which is a function of the peripheral speed and the crossed axes angle.

If the honing tool is in the form of a spur gear the trimming tool may be positioned with its axis crossing the axis of the honing tool at an angle extending in either direction from the axis of the honing tool. However, if the honing tool is in the form of a helical gear the trimming tool is inclined in the direction which produces simultaneous engagement with the largest number of teeth of the hone.

The drawings and the foregoing specification constitute a description of the improved method and apparatus for trimming a gear honing tool in such full, clear, concise and exact terms as to enable any person skilled in the art to practice the invention, the scope of which is indicated by the appended claims.

What I claim as my invention is:

1. The method of trimming a gear honing tool in the form of a gear of circular cross-section provided with teeth having crests, at least the outer portions of the teeth being formed of a resin compound containing abrasive particles, which comprises engaging the crests of the teeth of the honing tool with a generally cylindrical trimming tool having a trimming surface, with the axes of the tools crossed, and rotating the tools under radial pressure therebetween.

2. The method of trimming a gear honing tool in the form of a gear of circular cross-section provided with teeth having crests, at least the outer portions of the teeth being formed of a resin compound containing abrasive particles, which comprises engaging the crests of the teeth of the honing tool with a generally cylindrical trimming tool having a trimming surface, with the axes of the tools crossed, and rotating one of said tools directly and the other through the pressure engagement therebetween.

3. The method of trimming a gear honing tool in the form of a gear of circular cross-section provided with teeth having crests, at least the outer portions of the teeth being formed of a resin compound containing abrasive particles, which comprises engaging the crests of the teeth of the honing tool with a generally cylindrical trimming tool having a trimming surface, with the axes of the tools crossed, rotating the tools under radial pressure therebetween, and providing a relative traverse between the tools during rotation thereof in a direction which occupies a plane parallel to the axes of both of said tools.

4. The method of trimming a gear honing tool in the form of a gear of circular cross-section provided with teeth having crests, at least the outer portions of the teeth being formed of a resin compound containing abrasive particles, which comprises engaging the crests of the teeth of the honing tool with a generally cylindrical trimming tool having a trimming surface, with the axes of the tools crossed, rotating the tools under radial pressure therebetween, providing a relative traverse between the tools during rotation thereof in a direction which occupies a plane parallel to the axes of both of said tools, and providing intermittent radial feed between said tools to remove additional stock from the tooth crests.

5. The method of trimming the periphery of a gear honing tool in the form of a gear of circular cross-section provided with teeth having crests, at least the outer portions of the teeth being formed of a resin compound containing abrasive particles, which comprises engaging the crests of the teeth of the honing tool with a generally cylindrical trimming tool having its periphery shaped to effect a material-removing trimming action on the crests of the teeth of the honing tool when rotated therewith under radial pressure therebetween, maintaining the tools under radial pressure, driving one of the tools in rotation and rotating the other tool as a result of frictional contact between said tools, thereby removing material radially inwardly from the crests of the teeth of the honing tool to reduce its outside diameter.

6. The method of claim 5 in which the honing tool is in the form of a helical gear and in which the axes of said tools are parallel.

7. The method of claim 5 in which the axes of said tools are crossed.

8. The method of claim 7 which comprises providing a relative traverse between said tools in a direction which occupies a plane parallel to the axes of both of said tools and which is oblique to the axis of said trimming tool.

References Cited in the file of this patent

UNITED STATES PATENTS

| | | |
|---|---|---|
| 410,581 | Crowell | Sept. 10, 1889 |
| 430,204 | Wrigley | June 17, 1890 |
| 1,256,167 | Ross | Feb. 12, 1918 |
| 1,268,624 | Riley | June 4, 1918 |
| 1,474,614 | Bartlett | Nov. 20, 1923 |
| 1,508,430 | Wells | Sept. 16, 1924 |
| 1,737,551 | Aikin | Dec. 3, 1929 |
| 2,942,389 | Praeg et al. | June 28, 1960 |